United States Patent
Pothoven et al.

(10) Patent No.: US 6,856,092 B2
(45) Date of Patent: Feb. 15, 2005

(54) ELECTRODELESS LAMP

(75) Inventors: Floyd R. Pothoven, Lakewood, CA (US); Terry A. Pothoven, Lakewood, CA (US)

(73) Assignee: ITW, Inc., Bellflower, CA (US)

( * ) Notice: Subject to any disclaimer, the term of this patent is extended or adjusted under 35 U.S.C. 154(b) by 0 days.

(21) Appl. No.: 10/007,652

(22) Filed: Dec. 6, 2001

(65) Prior Publication Data

US 2002/0105274 A1 Aug. 8, 2002

Related U.S. Application Data

(60) Provisional application No. 60/251,712, filed on Dec. 6, 2000.

(51) Int. Cl.[7] .................................................. H01J 17/16
(52) U.S. Cl. ...................................... 313/634; 315/344
(58) Field of Search ................................ 313/634, 635, 313/636, 493, 153, 160; 315/248, 344

(56) References Cited

U.S. PATENT DOCUMENTS

| | | | |
|---|---|---|---|
| 3,942,058 A | 3/1976 | Haugsjaa et al. | |
| 4,010,400 A | 3/1977 | Hollister | |
| 4,232,243 A | 11/1980 | Rigden | |
| 4,266,162 A | 5/1981 | McNeill et al. | |
| 4,383,203 A | 5/1983 | Stanley | |
| 4,422,017 A | 12/1983 | Denneman et al. | |
| 4,485,333 A | 11/1984 | Goldberg | |
| 4,927,217 A | * 5/1990 | Kroes et al. | 315/248 |
| 5,438,235 A | * 8/1995 | Sommerer et al. | 313/489 |
| 5,592,048 A | * 1/1997 | Wei et al. | 313/570 |
| 5,637,963 A | * 6/1997 | Inoue et al. | 315/248 |
| 5,727,975 A | 3/1998 | Wei et al. | |
| 6,020,690 A | * 2/2000 | Takeda et al. | 315/248 |
| 6,310,443 B1 | * 10/2001 | MacLennan et al. | 315/248 |

\* cited by examiner

*Primary Examiner*—Gary Paumen
*Assistant Examiner*—Edwin A. Leon
(74) *Attorney, Agent, or Firm*—Alfred A. Fressola; Ware, Fressola, Van Der Sluys & Adolphson LLP

(57) ABSTRACT

A lamp 1 has a body 2 of sintered alumina ceramic material and an artificial sapphire window 3. The body 2 is initially molded in green state and the window is pressed into a front recess 4. The combination is fired at a temperature of the order of 1500° C., to fuse the body into a coherent pressure-tight state with the window. After partial cooling to the order of 600° C., a pellet of excitable material is added through a rear, charging aperture 5. A disc 6 of ceramic with frit 7 is placed over the aperture. The disc is irradiated by laser to fuse the frit and the disc to the body, thus sealing the excitable material into the lamp.

18 Claims, 2 Drawing Sheets

ELECTRODELESS LAMP

This application claims the benefit of U.S. Provisional Application(s) No(s).: 60/251,712 filing date Dec. 6, 2000.

TECHNICAL FIELD

The present invention relates to an electrodeless lamp, that is to say a hollow structure containing a material excitable by radio frequency energy to emit visible light.

BACKGROUND OF THE INVENTION

It is known to fabricate such a lamp from sintered ceramic components. For instance, U.S. Pat. No. 5,727,975 describes the production of lamps from components that are shrunk fitted to each other.

In my U.S. patent application No. 60/173,214, dated Dec. 27, 1999, I described an electrodeless lamp comprising:
 a hollow body of ceramic material having an open end and containing a charge of excitable material with a given melting point;
 a translucent closure at the open end of the body;
 a seal between the body and the closure, the seal being of fused material having a fusing point higher than that of the excitable material.

I had envisaged that the charge of excitable material would be contained in the hollow body prior to sealing of the closure onto the body. However, I now envisage that the translucent closure or window will be attached to the body prior to final closure.

SUMMARY OF THE INVENTION

The object of the invention is to provide an electrodeless lamp body having a translucent window.

According to the invention there is provided a body for an electrodeless lamp, the body comprising:
 a body preform of sintered ceramic material, defining the shape of the body which is hollow;
 an aperture in the preform for charging the excitable material into the hollow body; and
 a translucent window, the window and the preform being a coherent unit resulting from the window having been pressed onto the preform when green and the window having been united to the preform on firing of the ceramic material.

Preferably, the preform has a stepped recess at one end for receiving the window, which is accommodated in the stepped recess.

I envisage that the charging aperture may be sealed with a disc of sintered ceramic material fused to the body across the aperture. Alternatively, the body may be formed at the aperture with a collapsible lip, which seals the aperture on fusing of the lip.

The ceramic material of the preform can be of alumina ceramic or quartz.

The window can be of alumina ceramic, particularly artificial sapphire, or quartz.

According to another aspect of the invention there is a provided an electrodeless lamp having a body in accordance with the first aspect, with its charging aperture sealed and containing the excitable material.

According to a third aspect of the invention there is provided a method of manufacturing an electrodeless lamp, consisting in the steps of:
 forming a preform of green ceramic, the preform defining a hollow body shape with an aperture;
 pressing a window onto the preform;
 firing the green ceramic to fuse it and unite the window to the preform;
 charging excitable material into the hollow body;
 sealing the aperture.

Preferably, the excitable material is charged into the hollow body whilst the latter is still hot from the firing of the preform and the laser irradiation also is carried out whilst the hollow body is still hot.

Preferably, the lamp body is flushed with inert gas to cool it from its firing temperature and flush oxygen from it prior to injection of excitable material. Further the method preferably includes the evacuation of the lamp body prior to injection of excitable material.

BRIEF DESCRIPTION OF THE DRAWINGS

To help understanding of the invention, three specific embodiments thereof will now be described by way of example and with reference to the accompanying drawings, in which.

BEST MODE FOR CARRYING OUT THE INVENTION

Figure 1:
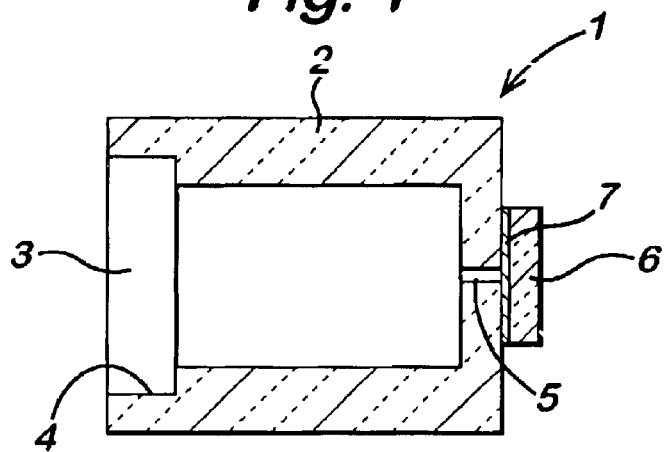
FIG. 1 is a cross-sectional view of a first lamp of the invention, with a disc seal.

Referring first to FIG. 1, the lamp 1 has a body 2 of sintered alumina ceramic material and an artificial sapphire window 3. The body 2 is initially moulded in green state and the window is pressed into a front recess 4. The combination is fired at a temperature of the order of 1500° C., to fuse the body into a coherent pressure-tight state with the window. After partial cooling to the order of 600° C., a pellet of excitable material is added through a rear, charging aperture 5. A disc 6 of ceramic with frit 7 is placed over the aperture. The disc is irradiated by laser to fuse the frit and the disc to the body, thus sealing the excitable material into the lamp.

Figure 2:
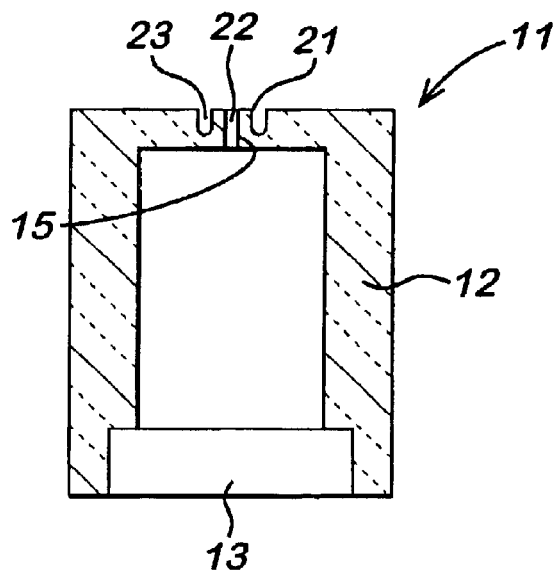
FIG. 2 is a similar view of a second lamp, with a collapsible lip aperture prior to sealing.
Figure 3:
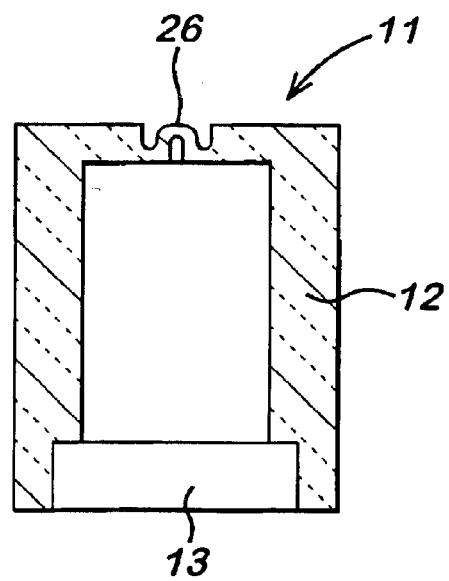
FIG. 3 is a similar view of the second lamp after sealing.

Referring now to FIGS. 2 & 3, the lamp 11 has a body 12 and window 13 formed and sealed together in essentially the same manner as in the first embodiment. However, the charging aperture 15 has a lip 21 around its orifice 22, the lip being defined by a groove 23. The lip is such that on charging of the excitable material into the body, and laser irradiation of the lip, the lip collapses into a fused closure 26 to close the aperture at its orifice entrapping the excitable material.

The choice of the inert gas and the excitable material will be within the abilities of the man skilled in the art, as will be the choice of ceramic material. This can be of alumina ceramic or quartz. Equally, the window can be of alumina for example artificial sapphire or of quartz. The excitable material can be of indium bromide with argon or krypton or sulphur with krypton.

Figure 4:
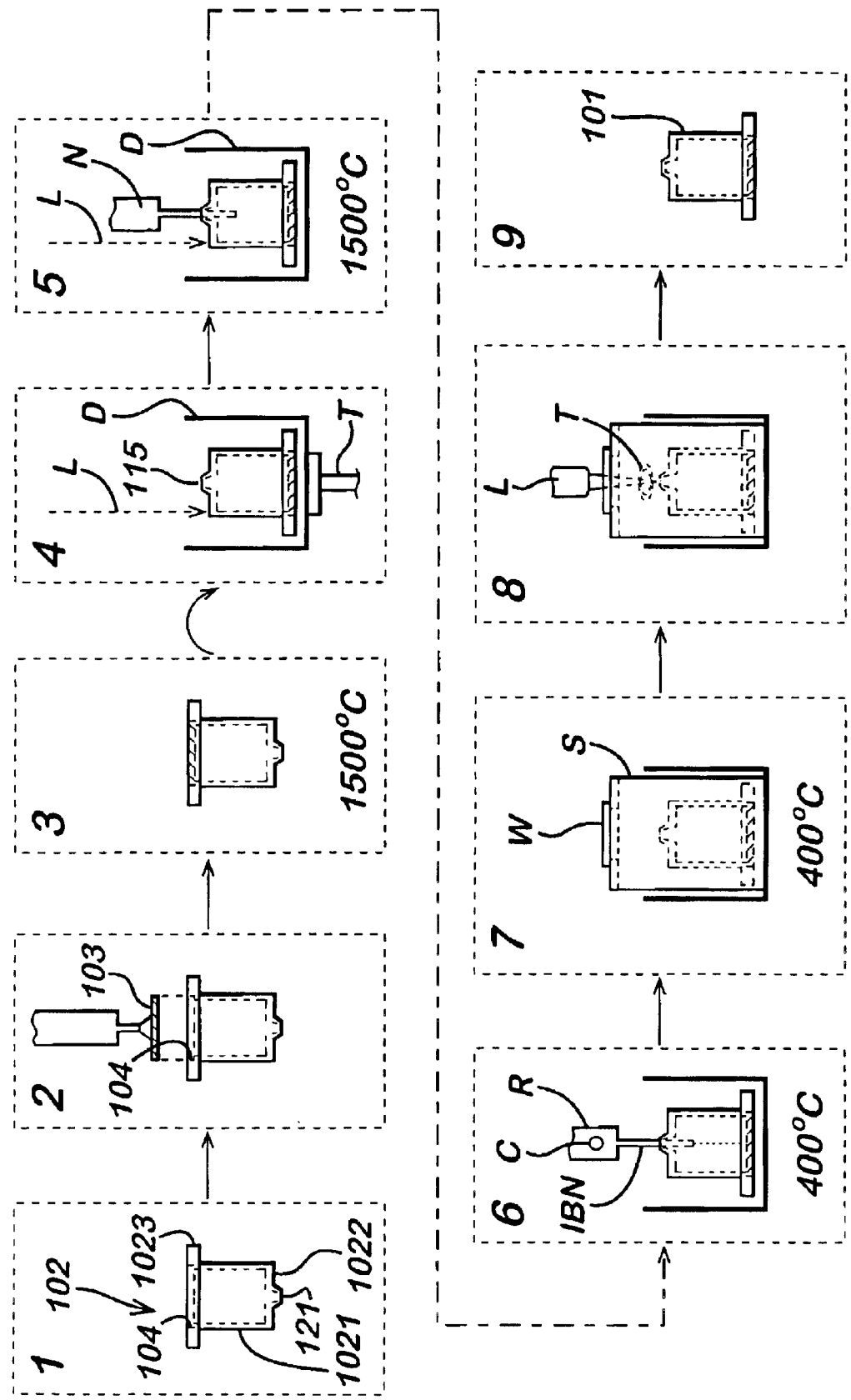
FIG. 4 is a process flow diagram for forming another lamp of the invention.

Referring now to FIG. 4, there is shown a process flow diagram for forming another lamp of the invention. It will be described in accordance with the steps shown in the Figure.

Step 1. A preform for the lamp body 102 is moulded from green ceramic material. It has a circular cylindrical side wall 1021, with an end wall 1022, having a central sealing lip 121 defining a charging aperture 115. Its other end has a rim 1023 surrounding a recess 104.

Step 2. An artificial sapphire window 103 is pressed into the lamp body 102 at the recess 104.

Step 3. The body and window are fired at 1500° C. This unifies the body and the window to it.

Step 4. The body and window are inverted and robotically placed centrally on a turntable T within an open topped dish D. A laser L is arranged above the body and used to maintain the temperature of the body at 1500° C. by irradiation.

Step 5. A krypton injection needle N is inserted through the aperture 115 far enough for its end to be close to the window. Preferably the needle has a closed end with side ports. The krypton flushes oxygen from the body and flows into the dish D, where it is retained, whereby oxygen is displaced from the body.

Step 6. Cooler krypton is now injected to cool the body to 400° C. The krypton needle is withdrawn and an indium bromide injection needle IBN is inserted into the body in its stead. The needle has a small, heated reservoir R of indium bromide with a piezoelectric crystal C in its side wall. Pulsing of the crystal forces a droplet of the molten indium bromide from the needle IBN into the body.

Step 7. Immediately after injection, the needle is withdrawn and a vacuum shroud S is dropped over the body 102 to seal with the dish. The shroud is evacuated swiftly to remove any possible trace of oxygen. The shroud is refilled with krypton and the lamp body maintained at 400° C. This is by laser irradiation through a window W in the shroud.

Step 8. The laser L is trepanned around the lip 121, which melts in against itself, thereby sealing the body, with the indium bromide sealed inside. To attract possible vaporised ceramic material from depositing on the window W, an annular cold trap T is positioned between the window and the lamp body.

Step 9. The vacuum shroud is lifted and the finished lamp 101 is removed and set aside to cool.

What is claimed is:

1. A body for an electrodeless lamp of ceramic material and containing excitable material, the body comprising:
    a one piece body preform of entirely sintered ceramic material, defining the shape of the body which is hollow; and
    a translucent window on the body, the window and the preform being a coherent unit resulting from the window having been pressed onto the preform when green and the window having been united to the preform on firing of the ceramic material for entirely sintering the body preform;
the body further comprising:
    an aperture in the entirely sintered preform for charging the excitable material into the hollow body.

2. An electrodeless lamp body according to claim 1, wherein the preform has a stepped recess at one end for receiving the window, which is accommodated in the stepped recess.

3. An electrodeless lamp body according to claim 1, wherein the body has a flat end opposite from the window for receiving a disc of sintered ceramic material for sealing the aperture.

4. An electrodeless lamp body according to claim 1, wherein the ceramic material of the preform is of alumina ceramic or quartz.

5. An electrodeless lamp body according to claim 1, wherein the window is of artificial sapphire or of quartz.

6. An electrodeless lamp body according to claim 1, wherein the aperture is at an end of the preform opposite from the window.

7. An electrodeless lamp comprising a lamp body according to claim 1, the body being sealed at its charging aperture and containing excitable material.

8. An electrodeless lamp according to claim 7, wherein the body has a flat end opposite from the window for receiving a disc of sintered ceramic material for sealing the aperture, the ceramic disc being sealingly adhered to the preform with the interposition of fit material.

9. An electrodeless lamp comprising a lamp body according to claim 1, the body being sealed at its charging aperture and containing excitable material.

10. An electrodeless lamp according to claim 9, wherein the body has a flat end opposite from the window for receiving a disc of sintered ceramic material for sealing the aperture, the ceramic disc being sealingly adhered to the preform with the interposition of flit material.

11. An electrodeless lamp according to claim 9, wherein the aperture in the preform has a surrounding formation which is collapsible on laser irradiation to seal the aperture, the aperture being at an end of the preform opposite from the window, the formation around the aperture being collapsed to seal it.

12. A body for an electrodeless lamp of ceramic material and containing excitable material, the body comprising:
    a one piece body preform of sintered ceramic material, defining the shape of the body which is hollow;
    an aperture in the preform for charging the excitable material into the hollow body; and
    a translucent window, the window and the preform being a coherent unit resulting from the window having been pressed onto the preform when green and the window having been united to the preform on firing of the ceramic material, wherein the aperture in the preform has a surrounding formation which is collapsible on laser irradiation to seal the aperture, the aperture preferably being at an end of the preform opposite from the window.

13. An electrodeless lamp body according to claim 12, wherein the surrounding formation comprises an annular lip around the aperture.

14. A body for an electrodeless lamp of ceramic material and containing excitable material, the body comprising:
    a one piece body preform of sintered ceramic material, defining the shape of the body which is hollow;
    an aperture in the preform for charging the excitable material into the hollow body; and
    a translucent window, the window and the preform being a coherent unit resulting from the window having been pressed onto the preform when green and the window having been united to the preform on firing of the ceramic material, the body being sealed at its charging aperture and containing excitable material, wherein the aperture in the preform has a surrounding formation which is collapsible on laser irradiation to seal the aperture, the aperture being at an end of the preform opposite from the window, the formation around the aperture being collapsed to seal it.

15. A body for an electrodeless lamp of ceramic material and containing excitable material, the body comprising:
    a one piece body preform of sintered ceramic material, defining the shape of the body which is hollow;
    a translucent window on the body, the window and the preform being a coherent unit resulting from the window having been pressed onto the preform when green and the window having been united to the preform on firing of the ceramic material for sintering of the body preform; and an aperture in the sintered preform for charging the excitable material into the hollow body, the aperture having:
   a surrounding formation which is collapsible on laser irradiation to seal the aperture.

16. An electrodeless lamp body according to claim 15, wherein the surrounding formation comprises an annular lip around the aperture.

17. An electrodeless lamp body according to claim 15, wherein the ceramic material of the preform is of alumina ceramic or quartz.

18. An electrodeless lamp body according to claim 15, wherein the window is of artificial sapphire or of quartz.

* * * * *

UNITED STATES PATENT AND TRADEMARK OFFICE
CERTIFICATE OF CORRECTION

PATENT NO. : 6,856,092 B2  Page 1 of 1
DATED : February 15, 2005
INVENTOR(S) : Pothoven et al.

It is certified that error appears in the above-identified patent and that said Letters Patent is hereby corrected as shown below:

<u>Column 4,</u>
Lines 11 and 19, please delete the word "fit" and insert the word -- frit -- therefor.

Signed and Sealed this

Tenth Day of May, 2005

JON W. DUDAS
*Director of the United States Patent and Trademark Office*